(12) United States Patent
Kamiya et al.

(10) Patent No.: US 8,127,183 B2
(45) Date of Patent: Feb. 28, 2012

(54) MICROCOMPUTER SYSTEM

(75) Inventors: Masahiro Kamiya, Nishio (JP); Kenji Yamada, Gamagori (JP); Hideaki Ishihara, Okazaki (JP)

(73) Assignee: Denso Corporation, Kariya (JP)

( * ) Notice: Subject to any disclaimer, the term of this patent is extended or adjusted under 35 U.S.C. 154(b) by 1279 days.

(21) Appl. No.: 11/819,555

(22) Filed: Jun. 28, 2007

(65) Prior Publication Data
US 2008/0016509 A1    Jan. 17, 2008

(30) Foreign Application Priority Data

Jun. 30, 2006  (JP) .................................. 2006-181510
Apr. 2, 2007   (JP) .................................. 2007-96634

(51) Int. Cl.
*G06F 11/00*  (2006.01)
*G06F 13/26*  (2006.01)

(52) U.S. Cl. ........ 714/48; 714/36; 714/38.1; 714/38.13; 710/265; 718/103; 718/108

(58) Field of Classification Search .................... 714/32, 714/38.1, 38.13; 713/190; 718/103, 108
See application file for complete search history.

(56) References Cited

U.S. PATENT DOCUMENTS

| | | | | |
|---|---|---|---|---|
| 4,276,594 A | * | 6/1981 | Morley | 713/600 |
| 4,799,148 A | * | 1/1989 | Nishioka | 710/265 |
| 5,889,988 A | * | 3/1999 | Held | 718/103 |
| 5,983,355 A | * | 11/1999 | Kenny et al. | 713/322 |
| 6,304,957 B1 | | 10/2001 | Ishihara et al. | |
| 7,721,083 B2 | * | 5/2010 | Ikedo | 713/2 |
| 2003/0140245 A1 | * | 7/2003 | Dahan et al. | 713/200 |
| 2004/0153812 A1 | * | 8/2004 | Miyayama et al. | 714/36 |
| 2004/0268103 A1 | * | 12/2004 | Shelor | 712/244 |
| 2005/0060461 A1 | * | 3/2005 | Yang | 710/260 |
| 2005/0102579 A1 | * | 5/2005 | Miyayama et al. | 714/38 |
| 2006/0053350 A1 | * | 3/2006 | Tsuyuno et al. | 714/55 |
| 2006/0184669 A1 | * | 8/2006 | Vaidyanathan et al. | 709/224 |

FOREIGN PATENT DOCUMENTS

| | | |
|---|---|---|
| JP | A-8-292901 | 11/1966 |
| JP | A-63-280345 | 11/1988 |
| JP | A-5-189255 | 7/1993 |
| JP | A-203-99293 | 4/2003 |

OTHER PUBLICATIONS

Office Action mailed Aug. 26, 2011 in corresponding JP application No. 2007-96634 (and English translation).

* cited by examiner

*Primary Examiner* — Robert Beausoliel, Jr.
*Assistant Examiner* — Jeison C Arcos
(74) *Attorney, Agent, or Firm* — Posz Law Group, PLC

(57) ABSTRACT

A microcomputer system includes a CPU, a memory, and a runaway detector. The CPU includes a controller for outputting a task information signal. The task information signal is activated, if the CPU performs the most important task at the present time. A program for the most important task is stored in the memory. The runaway detector includes an address register and a program area checker. The address register stores start and end addresses of the program area. The program area checker determines whether an execution address of the CPU is within the program area by comparing the execution address with each of the start and end addresses. The runaway detector detects a task runaway in the event of conflict between the task information signal and a result of a determination of the program area checker.

9 Claims, 7 Drawing Sheets

MICROCOMPUTER SYSTEM

CROSS REFERENCE TO RELATED APPLICATION

This application is based on and incorporates herein by reference Japanese Patent Applications No. 2006-181510 filed on Jun. 30, 2006 and No. 2007-96634 filed on Apr. 2, 2007.

FIELD OF THE INVENTION

The present invention relates to a time-sharing microcomputer system for simultaneously performing multiple tasks, one of which has the highest priority.

BACKGROUND OF THE INVENTION

A time-sharing microcomputer system has been proposed that simultaneously performs multiple tasks, one of which is a system task for controlling the entire behavior of the microcomputer system. If the system task runs away out of control, the microcomputer system is wholly affected by the system task runaway. Therefore, the system task is highly prioritized.

Generally, a watchdog timer is used to detect the system task runaway. However, the watchdog timer causes a relatively large time lag between occurrence and detection of the system task runaway. Accordingly, the runaway condition lasts for a relatively long time. As a result, the microcomputer system may be significantly affected by the system task runaway.

U.S. Pat. No. 6,304,957 corresponding to JP-A-6-250855 and JP-A-6-250857 discloses a technique for detecting a task runaway by using a check code embedded in a portion of an instruction code. The technique determines whether, based on the check code, an instruction fetched by a central processing unit indicates a task to be executed at the present time. However, the number of instruction codes available is finite. Therefore, when the portion of the instruction code is used as the check code, the number of instruction codes available is reduced.

SUMMARY OF THE INVENTION

In view of the above-described problem, it is an object of the present invention to provide a microcomputer system in which a task runaway is immediately detected without using a portion of an instruction code.

A microcomputer system includes a central processing unit, a memory, and a runaway detector. The central processing unit includes a controller for outputting a task information signal indicative of whether the central processing unit performs the most important task at a present time. The task information signal has a first state, if the central processing unit performs the most important task at the present time. In contrast, the task information signal has a second state, if the central processing unit doesn't the most important task at the present time. The memory has a program area for storing a program for the most important task.

The runaway detector includes a program start address register, a program end address register, and a program area checker. The program start address register stores a program start address of the program area. The program end address register stores a program end address of the program area. The program area checker determines whether an execution address, where an instruction performed by the central processing unit at the present time is located, is within the program area by comparing the execution address with each of the program start address and the program end address. The runaway detector receives the task information signal from the central processing unit and detects a task runaway in the event of conflict between a state of the task information signal and a result of a determination of the program area checker.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
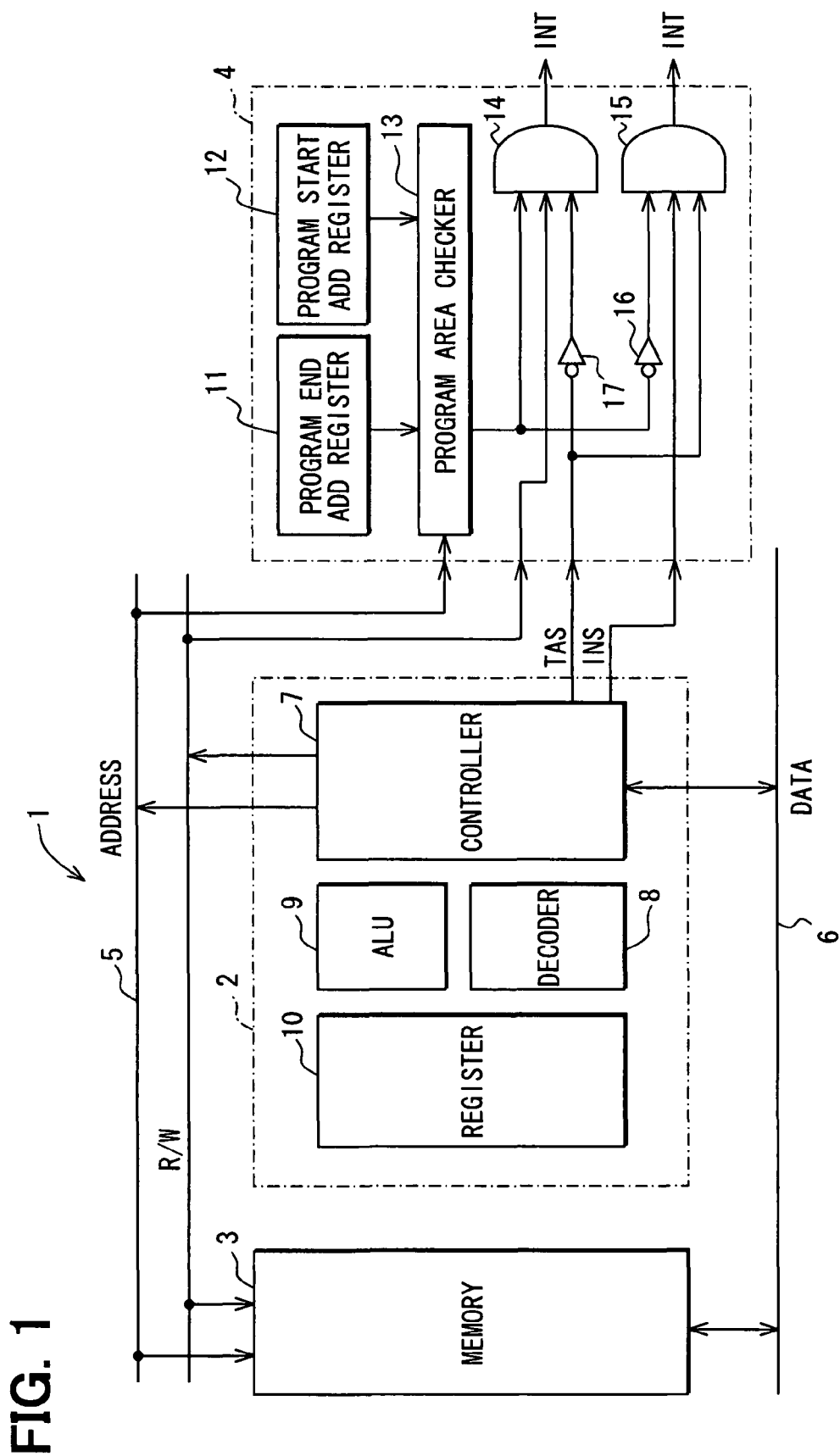
FIG. 1 is a functional block diagram of a microcomputer system according to a first embodiment of the present invention.

As shown in FIG. 1, a microcomputer system 1 according to a first embodiment of the present invention includes a central processing unit (CPU) 2, an internal memory 3, and a runaway detector 4. The CPU 2, the internal memory 3, and the runaway detector 4 are linked to each other via an address bus 5 and a data bus 6. The microcomputer system 1 may be implemented in a chip form.

The CPU 2 includes a controller 7 acting as a signal output section, a decoder 8, an arithmetic logic unit (ALU) 9, and a register 10. The controller 7 outputs a control signal such as a read and write (R/W) signal and accesses the address bus 5 and the data bus 6 to control data transfer to and from outside sources. The internal memory 3 stores a control program for the CPU 2. The CPU 2 fetches an instruction and data from the internal memory 3. The fetched instruction and data are stored in the register 10 and decoded by the decoder 8. The ALU 9 performs computation based on the decoded result. The computation result is written to the internal memory 3 and/or the register 10 as needed.

During an instruction fetch cycle, the CPU 2 accesses the address bus 5 and the data bus 6 to fetch the instruction. In contrast, during a data access cycle, the CPU 2 accesses the address bus 5 and the data bus 6 to read or write the data. While the CPU 2 accesses the address bus 5 and the data bus 6, the controller 7 outputs an instruction fetch signal INS indicating whether the CPU 2 executes the instruction fetch cycle or the data access cycle. The CPU 2 is specialized to simultaneously perform multiple tasks by using time sharing (i.e., task scheduling). For example, the CPU 2 simultaneously performs two tasks S, X. The controller 7 outputs a task information signal TAS indicating which of the tasks S, X is performed at the present time by the CPU 2. Programs for the tasks S, X are stored in the internal memory 3.

The task S controls the entire behavior of the microcomputer system 1. For example, the task S executes a routine for monitoring a runaway of the task X and executes a backup sequence for fail-safe purposes. The task S runs inside a loop and acts as a software timer. Branch instructions are prohibited in advance so that the task S is repeatedly performed on each cycle of the loop.

In contrast, for example, the task X performs arithmetic operation and is allowed to execute the branch instructions. Also, the task X performs processing by using a time determined by the number of iterations of the loop of the task S.

As described above, the task S controls the entire behavior of the microcomputer system 1. Therefore, the task S has a higher priority than the task X. The task S and the task X correspond to L-task and A-task in U.S. Pat. No. 6,304,957, respectively.

Figure 5:
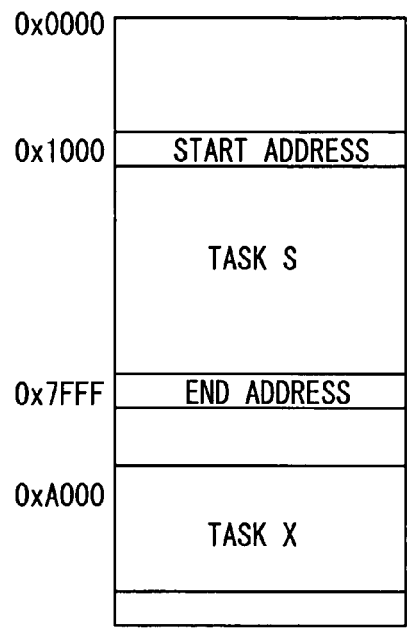
FIG. 5 is a diagram of a memory map of the microcomputer system of FIG. 1.

The runaway detector 4 includes a program end address register 11, an program start address register 12, a program area checker 13, three-input AND gates 14, 15, and NOT gates 16, 17. Program end and start addresses of the program for the task S are written to the program end and start address registers 11, 12, respectively, during an initialization performed when the CPU 2 boots up. In the first embodiment, as shown in FIG. 5, the program start address of the task S is set to "0x1000", and the program end address of the task S is set to "0x7FFF". Therefore, a program area of the task S is between "0x1000" and "0x7FFF" of the internal memory 3.

The program area checker 13 compares an execution address placed on the address bus 5 with each of the program start and end addresses of the task S to determine whether the execution address is within the program area of the task S. If the execution address is within the program area of the task S, a program area check signal is activated and becomes high. The program area check signal is fed to a first input of the AND gate 14. The program area check signal is also fed to a first input of the AND gate 15 via the NOT gate 16.

The control signal R/W is fed to a second input of the AND gate 14 from the controller 7 of the CPU 2. The control signal R/W is low, when the CPU 2 executes a read cycle. In contrast, the control signal R/W is high, when the CPU 2 executes a write cycle. The task information signal TAS is fed to a third input of the AND gate 14 via the NOT gate 17 from the controller 7 of the CPU 2. The task information signal TAS is also fed to a second input of the AND gate 15.

The instruction fetch signal INS is fed to a third input of the AND gate 15 from the controller 7 of the CPU 2. The instruction fetch signal INS is high, when the CPU 2 executes the instruction fetch cycle. The AND gates 14, 15 output first and second interrupt request signals INT, respectively, for causing the CPU 2 to perform exception processing.

Figure 2:
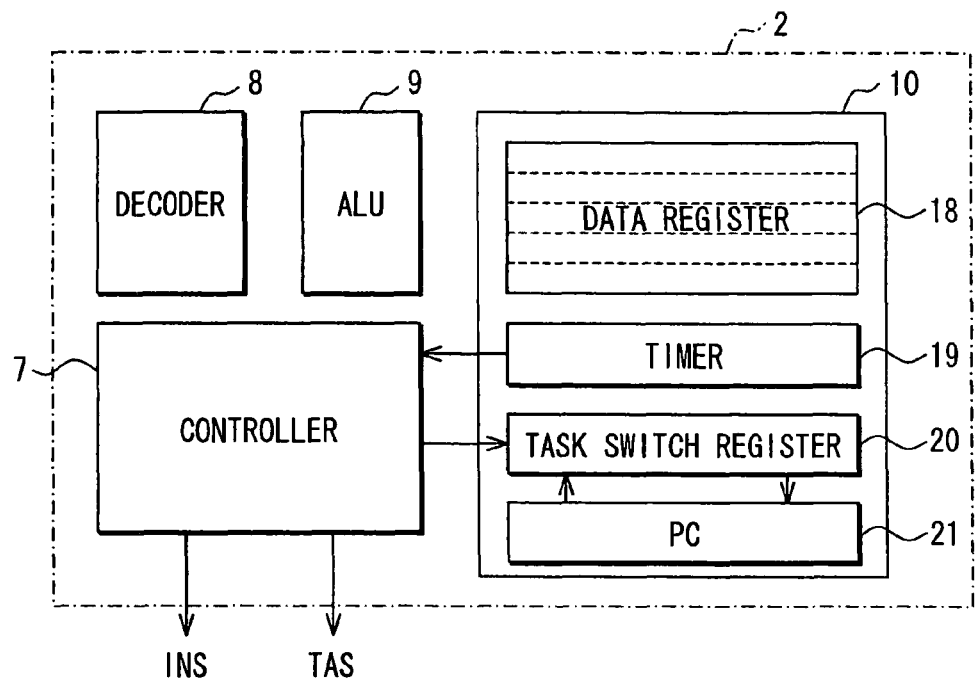
FIG. 2 is a block diagram of a central processing unit in the microcomputer system of FIG. 1.

The register 10 of the CPU 2 is shown in detail in FIG. 2. The register 10 includes a data register 18, a timer 19, a task switch register 20, and a program counter 21. The timer 19 counts down from an initial value to zero synchronously with a clock frequency of the CPU 2. When a timer value of the timer 19 reaches zero, the initial value or a predetermined value is reloaded into the timer 19 so that the timer 19 repeats the count down operation. The controller 7 monitors the timer value of the timer 19 and performs task-switching operation when the timer value changes from one to zero.

The controller 7 controls the task switch register 20 so that the task switch register 20 saves an address to the program counter 21 and restores the address from the program counter 21. For example, in the case of FIG. 3, when the timer value of the timer 19 is five, which is not the initial value, the CPU 2 performs the task X. As the timer 19 counts down, the address stored in the program counter 21 increases by two (16-bit access). Accordingly, the execution address of the CPU 2 contains an instruction fetched one clock early. In short, the CPU 2 executes the instruction fetched one clock early.

When the timer value of the timer 19 reaches one, the controller 7 outputs a save command to the task switch register 20. In response to the save command, an address "X+6" not "X+8" is saved to the task switch register 20, because an instruction contained in the address "X+6" is not completed. As a result, the execution of the task X is resumed at the address "X+6"

Then, when the timer value of the timer 19 reaches zero, the controller 7 outputs a restore command to the task switch register 20. In response to the restore command, the task switch register 20 restores an address "S+0", which is stored in the task switch register 20 at this time, to the program counter 21. At the same time, the controller 7 activates the task information signal TAS so that the task information signal TAS becomes high. In this case, the CPU 2 only fetches the address "S+0", i.e., executes a no operation (NOP) instruction.

If all three conditions below are simultaneously satisfied, the output of the AND gate 14 of the runaway detector 4 becomes high so that the AND gate 14 outputs the first interrupt signal INT.

1. The execution address placed on the address bus 5 is within the program area of the task S.
2. The CPU 2 executes the write cycle so that the control signal R/W is high.
3. The task information signal TAS is low to indicate the task X.

As long as the CPU 2 operates normally, all the conditions 1-3 are not simultaneously satisfied.

If all three conditions below are simultaneously satisfied, the output of the AND gate 15 of the runaway detector 4 becomes high so that the AND gate 15 outputs the second interrupt signal INT.

4. The execution address placed on the address bus 5 is outside the program area of the task S.
5. The CPU 2 executes the instruction fetch cycle so that the instruction fetch signal INS is high.
6. The task information signal TAS is high to indicate the task S.

As long as the CPU 2 operates normally, all the conditions 4-6 are not simultaneously satisfied.

In short, one of the outputs of the AND gates 14,15 of the runaway detector 4 becomes high, when the address of the task the CPU 2 executes is different from the execution address placed on the address bus 5. The task runaway is detected based on the fact that one of the outputs of the AND gates 14,15 of the runaway detector 4 becomes high. When one of the outputs of the AND gates 14, 15 becomes high, one of the first and second interrupt request signals INT is fed to the CPU 2 so that an interrupt occurs. When the interrupt occurs, the CPU 2 performs the exception processing according to the cause of the interrupt. In the exception processing, a necessary initialization for the microcomputer system 1 is performed to correct the runaway condition.

Figure 3:
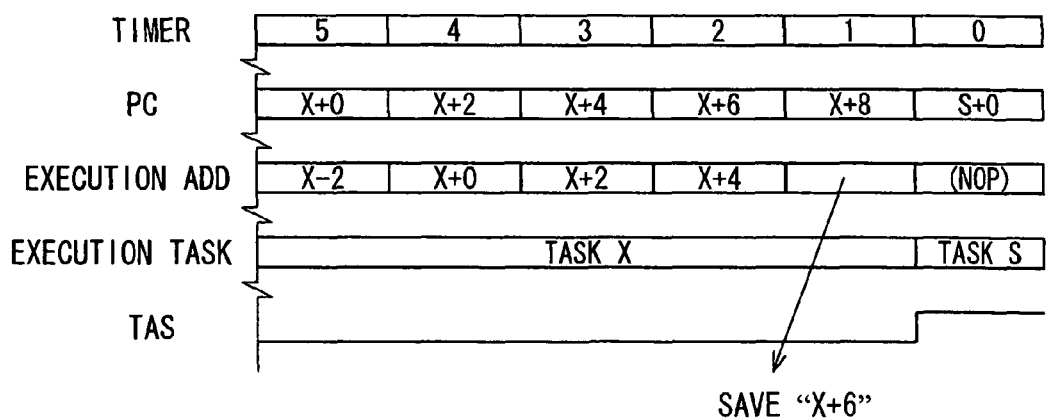
FIG. 3 is a timing chart of the central processing unit of FIG. 2.
Figure 4A:
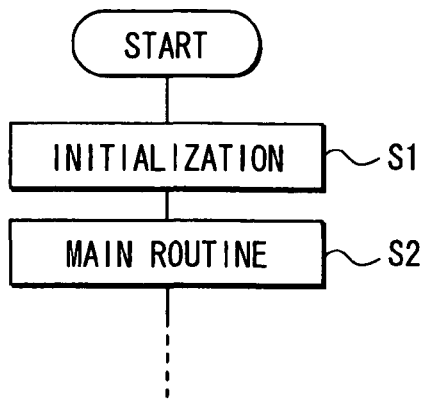
FIGS. 4A, 4B are flowcharts of the central processing unit of FIG. 2.

In normal condition, the CPU 2 operates as shown in FIG. 4A. At step S1, a reset of the CPU 2 is released so that the CPU 2 is initialized. During the initialization, the program end and start addresses of the task S are written to the program end and start address registers 11, 12, respectively. Then, the CPU 2 proceeds to step S2 and executes a main routine. In the main routine, the task S and the task X are alternately performed as shown in FIG. 3.

Figure 4B:
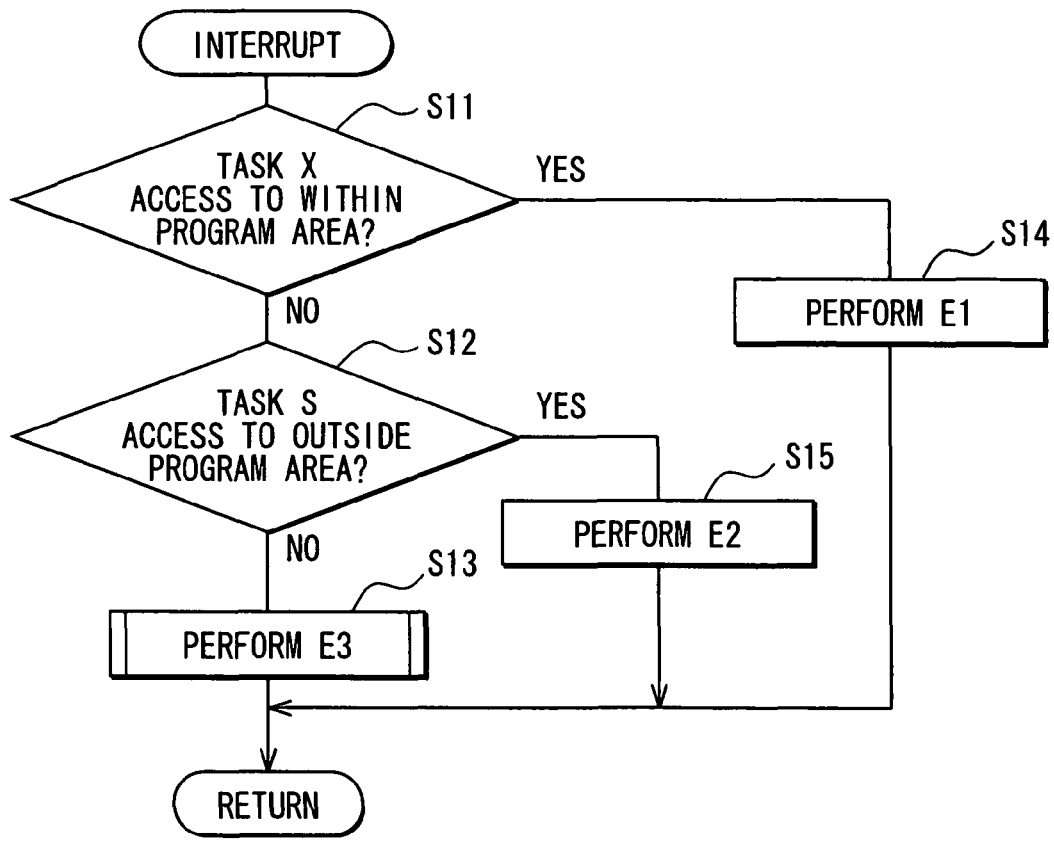

In contrast, when the interrupt occurs, the CPU 2 operates as shown in FIG. 4B. At step S11, the CPU 2 determines whether the interrupt is caused by the first interrupt request signal INT outputted from the AND gate 14, for example, by referring to an interrupt cause register (not shown) for indicating the cause of the interrupt. If the CPU 2 determines that the interrupt is caused by the first interrupt request signal INT, the CPU 2 proceeds to step S14. At step S14, the CPU 2 performs a first exception processing E1 to resolve a first interrupt cause due to the fact that the task X accesses within the program area of the task S. In contrast, if the CPU 2 determines that the interrupt is not caused by the first interrupt request signal INT, the CPU 2 proceeds to step S12.

At step S12, the CPU 2 determines whether the interrupt is caused by the second interrupt request signal INT outputted from the AND gate 15, for example, by referring to the interrupt cause register. If the CPU 2 determines that the interrupt is caused by the second interrupt request signal INT, the CPU 2 proceeds to step S15. At step S15, the CPU 2 performs a second exception processing E2 to resolve a second interrupt cause due to the fact that the task S accesses outside the program area of the task S. In contrast, if the CPU 2 determines that the interrupt is not caused by the second interrupt request signal INT, the CPU 2 proceeds to step S13. At step S13, the CPU 2 performs a third exception processing E3 to resolve other causes than the first and second interrupt causes.

In the microcomputer system 1 according to the first embodiment, when the CPU 2 performs the task S, the task information signal TAS is activated and becomes high. The program area checker 13 of the runaway detector 4 compares the execution address placed on the address bus 5 with each of the program start and end addresses of the task S to determine whether the execution address is within the program area of the task S. If the execution address is within the program area of the task S, the program area check signal is activated and becomes high.

The task runaway is detected, when the state of the task information signal TAS is opposite to the state of the program area check signal. In other words, the task runaway is detected in the event of conflict between the state of the task information signal TAS and the result of the determination of the program area checker 13. For example, when the task information signal TAS is low and the program area check signal is high, the runaway is detected so that the AND gate 14 outputs the first interrupt request signal INT to the CPU 2.

Thus, the task runaway is detected by using a logic circuit. Unlike U.S. Pat. No. 6,304,957, since the task runaway is detected without using a portion of an instruction code, a reduction in the number of instruction codes available can be prevented.

The runaway detector 4 detects the task runaway, when the task information signal TAS indicates that the CPU 2 performs the task S and the program area check signal indicates that the execution address placed on the address bus 5 is outside the program area of the task S. In such an approach, the task runaway can be surely detected, even when the execution address for the task S is improperly placed on the address bus 5.

Further, the runaway detector 4 detects the task runaway, when the task information signal TAS indicates that the CPU 2 performs other task (i.e., task X) than the task S and the program area check signal indicates that the execution address placed on the address bus 5 is within the program area of the task S. In such an approach, the task runaway can be surely detected, even when an execution address for the other task is improperly placed on the address bus 5.

Furthermore, upon the detection of the task runaway, the runaway detector 4 outputs the interrupt request signal INT to the CPU 2. In response to the interrupt request signal INT, the CPU 2 is interrupted to perform the exception processing, according to the cause of the interrupt, to resolve the cause of the interrupt. Thus, the task runaway condition is corrected so that the microcomputer system 1 returns to normal condition.

Second Embodiment

Figure 6:
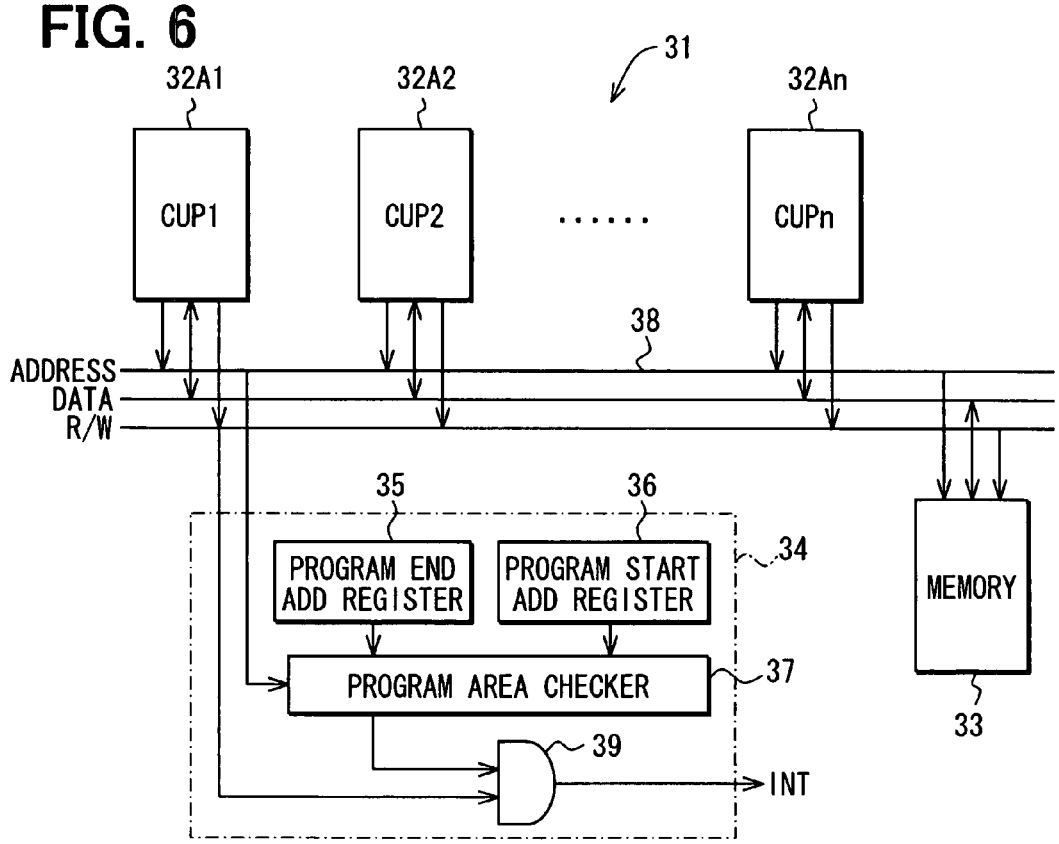
FIG. 6 is a functional block diagram of a microcomputer system according to a second embodiment of the present invention.

As shown in FIG. 6, a microcomputer system 31 according to a second embodiment of the present invention includes multiple CPUs 32A1-32An (i.e., CPU1-CPUn), where n is a positive integer), an internal memory 33, and a runaway detector 34. The CPUs 32A1-32An simultaneously perform multiple tasks stored in the internal memory 33.

For example, the CPU 32A1 acts as a master and other CPUs 32A2-32An act as a slave. When the microcomputer system 31 is powered on, only the master CPU 32A1 boots up. After performing a necessary initialization for the microcomputer system 31, the master CPU 32A1 determines tasks allocated to the slave CPUs 32A2-32An and determines timings at which resets of the slave CPUs 32A2-32An are released so that slave CPUs 32A2-32An boot up. Therefore, a task Z performed by the master CPU 32A1 has a higher priority than any other task executed by the slave CPUs 32A2-32An.

The runaway detector 34 operates in a similar manner as the runaway detector 4 of the first embodiment. Specifically, the runaway detector 34 includes a program end address register 35, a program start address register 36, a program area checker 37, and a two-input AND gate 39. Program end and start addresses of a program for the task Z are written to the program end and start address registers 35, 36, respectively.

The program area checker 37 compares an execution address placed on an address bus 38 with each of the program start and end addresses of the task Z to determine whether the execution address is within the program area of the task S. If the execution address is outside the program area of the task Z, the program area checker 37 activates a program area check signal so that the program area check signal becomes high. The program area check signal is fed to a first input of the AND gate 39.

The master CPU 32A1 asserts an access signal, when the master CPU 32A1 performs bus access to access, for example, the address bus 38. The access signal is fed to a second input of the AND gate 39. Thus, the output of the AND gate 39 becomes high so that the AND gate 39 outputs an interrupt request signal INT to the master CPU 32A1, when both the program area check signal and the access signal are high. In short, when the master CPU 32A1 performs the bus access despite the fact that the execution address is outside the program area of the task Z, the AND gate 39 outputs the interrupt request signal INT to the master CPU 32A1. In response to the interrupt request signal INT, the master CPU 32A1 is interrupted and performs an exception processing according to the cause of the interrupt to correct the task runaway condition.

Third Embodiment

Figure 7:
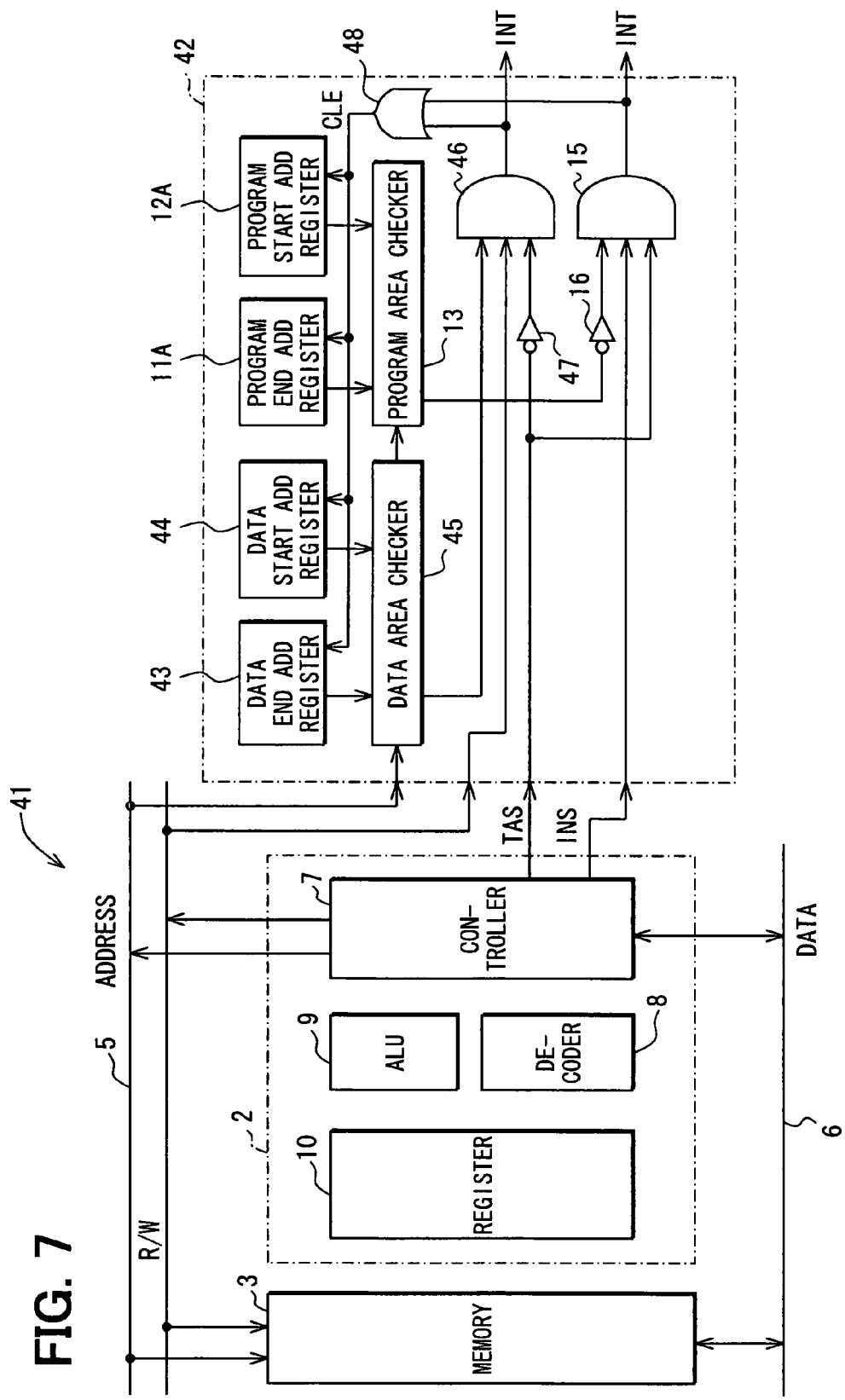
FIG. 7 is a functional block diagram of a microcomputer system according to a third embodiment of the present invention.

A microcomputer system 41 according to a third embodiment is shown in FIG. 7. As can be seen by comparing FIG. 1 and FIG. 7, the microcomputer system 41 is similar to the microcomputer system 1 according to the first embodiment. In the third embodiment, the task runaway is detected based on both the program area and a data area of the task S.

The microcomputer system 41 includes a runaway detector 42 instead of the runaway detector 4 of the microcomputer system 1. The runaway detector 42 includes a program end address register 11A, a program start address register 12A, a program area checker 13, the three-input AND gate 15, the NOT gate 16, a data end address register 43, a data start address register 44, a data area checker 45, a three-input AND gate 46, a NOT gate 47, and an OR gate 48.

Figure 8:
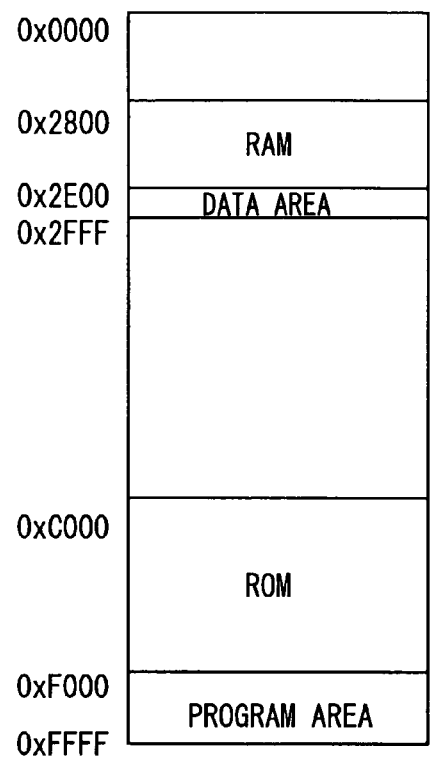
FIG. 8 is a diagram of a memory map of the microcomputer system of FIG. 7.

Program start and end addresses of the program for the task S are written to the program end and start address registers 11A, 12A, respectively. In the third embodiment, as shown in FIG. 8, the program start address of the task S is set to "0xF000", and the program end address of the task S is set to "0xFFFF". Therefore, the program area of the task S is between "0xF000" and "0xFFFF".

Data end and start addresses of data for the task S are written to the data end and start address registers 43, 44, respectively. In the third embodiment, as shown in FIG. 8, the data start address of the task S is set to "0x2E00", and the data end address of the task S is set to "0x2FFF". Therefore, the data area of the task S is between "0x2E00" and "0x2FFF".

Like the program area checker 13, the data area checker 45 compares an execution address placed on the address bus 5 with each of the data start and end addresses of the task S to determine whether the execution address is within the program area of the task S. If the execution address is within the data area of the task S, a data area check signal is activated and becomes high. The data area check signal is fed to a first input of the AND gate 46. The control signal R/W is fed to a second input of the AND gate 46. The task information signal TAS is fed to a third input of the AND gate 46 via the NOT gate 47.

Figure 9A:
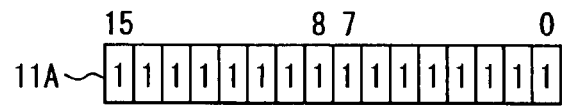
FIGS. 9A-9D are diagrams showing register values set to address registers of a runaway detector in the microcomputer system of FIG. 7.
Figure 9B:
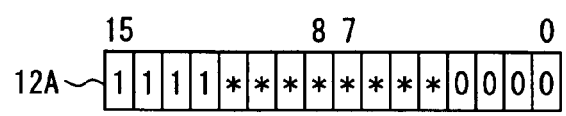
Figure 9C:
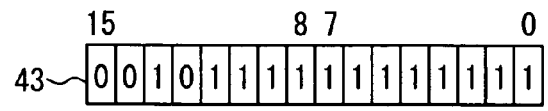
Figure 9D:

FIGS. 9A-9D show the program end address register 11A, the program start address register 12A, the data end address register 43, and the data start address register 44, respectively. Regarding the program end address register 11A and the data end address register 43, all bits are fixed as shown in FIGS. 9A, 9C. Regarding the data start address register 44, as shown in FIG. 9D, six bits starting from the most significant bit (MSB) and four bits starting from the least significant bit (LSB) are fixed, and the remaining six bits are variable. Regarding the program start address register 12A, as shown in FIG. 9B, four bits starting from MSB and four bits starting from LSB are fixed, and the remaining eight bits are variable.

Therefore, there is no need to set the program and data end addresses by means of a user's program. The data start address can be set in a range between "0x2C00" and "0x2FF0" by means of the user's program. The program start address can be set in a range between "0xF000" and "0xFFF0" by means of the user's program.

As shown in FIG. 7, the output of the AND gate 15 is connected to a first input of the OR gate 48. The output of the AND gate 46 is connected to a second input of the OR gate 48. Each of the program end address register 11A, the program start address register 12A, the data end address register 43, and the data start address register 44 has a clear input. The output of the OR gate 48 is connected to the clear input.

When one of the outputs of the AND gates 15, 46 becomes high, each of the program end address register 11A, the program start address register 12A, the data end address register 43, and the data start address register 44 is cleared. Specifically, the variable bits of the program start address register 12A and the data start address register 44 are cleared to zero. Alternatively, each of the program end address register 11A and the data end address register 43 has no clear input, because all the bits of the program end address register 11A and the data end address register 43 are fixed.

If all three conditions below are simultaneously satisfied, the output of the AND gate 46 of the runaway detector 42 becomes high so that the AND gate 46 outputs the first interrupt request signal INT.

7. The execution address placed on the address bus 5 is within the data area of the task S.
8. The CPU 2 executes the write cycle so that the control signal R/W is high.
9. The task information signal TAS is low to indicate the task X.

As long as the CPU 2 operates normally, all the conditions 7-9 are not simultaneously satisfied.

As described previously in the first embodiment, if all three conditions below are simultaneously satisfied, the output of the AND gate 15 of the runaway detector 46 becomes high so that the AND gate 15 outputs the second interrupt request signal.

4. The execution address placed on the address bus 5 is outside the program area of the task S.
5. The CPU 2 executes the instruction fetch cycle so that the instruction fetch signal INS is high.
6. The task information signal TAS is high to indicate the task S.

As long as the CPU 2 operates normally, all the conditions 4-6 are not simultaneously satisfied.

In short, one of the outputs of the AND gates 15, 46 of the runaway detector 42 becomes high, when the address of the task the CPU 2 executes is different from the execution address or execution address placed on the address bus 5. The task runaway is detected based on the fact that one of the outputs of the AND gates 15, 46 of the runaway detector 42 becomes high. When one of the outputs of the AND gates 15, 46 becomes high, one of the first and second interrupt request signals INT is fed to the CPU 2 so that the interrupt occurs. When the interrupt occurs, the CPU 2 performs an exception processing according to the cause of the interrupt. In the exception processing, the necessary initialization for the microcomputer system 41 is performed to correct the runaway condition.

Figure 10:
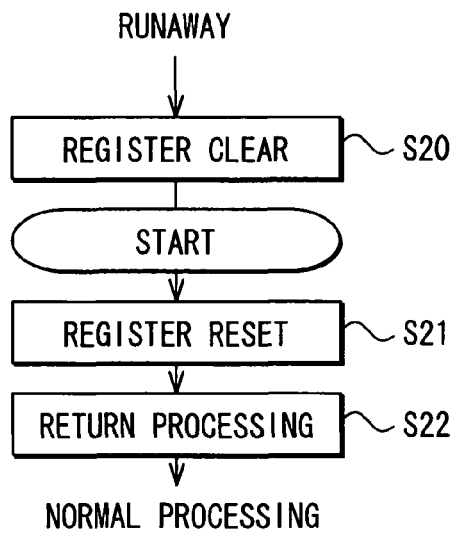
FIG. 10 is a flow chart showing an exception processing performed by a central processing unit in the microcomputer system of FIG. 7.

The exception processing performed by CPU 2 is illustrated by a flow chart of FIG. 10. When the runaway detector 72 detects the task runaway, each of the program end address register 11A, the program start address register 12A, the data end address register 43, and the data start address register 44 is initialized at step S20 prior to start of the exception processing. The register initialization is performed by a hardware logic circuit (not shown) in the CPU 2. In the register initialization, the variable bits of the program start address register 12A and the data start address register 44 are cleared to zero.

Then, the exception processing starts with step S21. At step S21, predetermined values are written to the variable bits of the program start address register 12A and the data start address register 44 so that the program start address register 12A and the data start address register 44 are reset. Then, the exception processing proceeds to step S22, where a return processing including other initializations are performed to correct the runaway condition. After step S22, the CPU 2 returns to normal processing.

As described above, the microcomputer system 41 according to the third embodiment includes the data area checker 45 in addition to the program area checker 13. The data area checker 45 compares the execution address placed on the address bus 5 with each of the data start and end addresses of the task S to determine whether the execution address is within the data area of the task S. The data area checker 45 outputs the data area check signal based on a result of the determination. The runaway detector 42 detects the task runaway in the event of conflict between the state of the task information signal TAS and the result of the determination of the data area checker 45. In such an approach, even when there is an improper access to the data area of the task S, the runaway task can be detected.

In the microcomputer system 41 according to the third embodiment, all the bits of the program end address register 11A and the data end address register 43 are fixed. In such an approach, address variation due to noise can be prevented so that the program and data end addresses can remain smaller than the program and data start addresses, respectively. In contrast, some bits of the program start address register 12A and the data start address register 44 are variable. In such an approach, the size of the program and data area can be adjusted.

The exception processing resets each of the program start address register and the program end address register to the program start address and the program end address, respectively. Thus, the CPU 2 can return to the normal processing even when the task runaway occurs.

Fourth Embodiment

Figure 11:
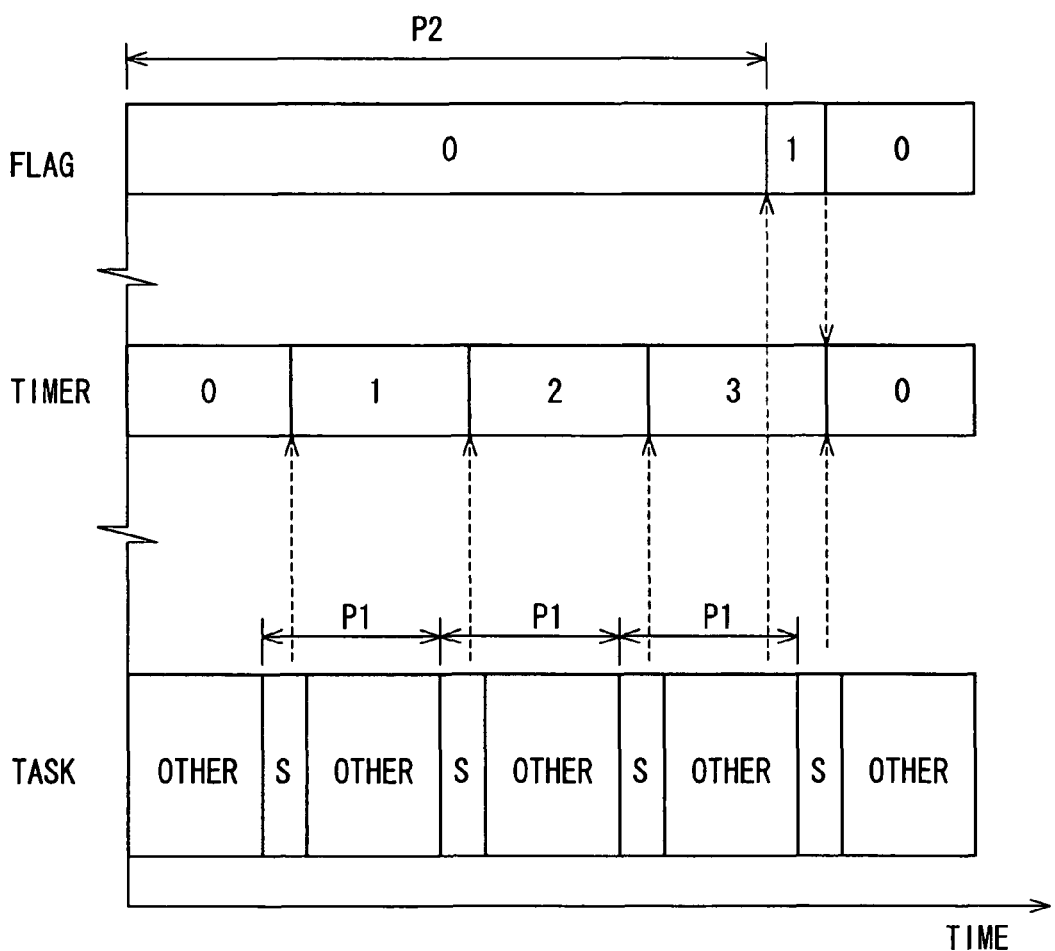
FIG. 11 is a timing chart of a central processing unit in a microcomputer system according to a fourth embodiment of the present invention.

A fourth embodiment of the present invention is shown in FIG. 11. Under normal conditions, the task S and other task (e.g., task S) are alternately performed on each first cycle P1. The task S controls a timer (not shown) so that the timer is incremented on each first cycle P1. The timer may be a counter circuit.

The other task sets a clear flag of the timer to one on each second cycle P2. The clear flag is set in a shared data area of the internal memory 3, and both the task S and the other task can access the shared data area. The task S monitors a state of the clear flag. The task S clears the timer to zero, when the clear flag is set to one. In the case of FIG. 11, the timer is cleared to zero, when a timer value of the timer is three.

If the other task runs away out of control, the clear flag remains zero. As a result, the timer continues to be incremented. For example, a threshold value of the timer is set to four. The task S detects a runaway of the other task, when the timer value exceeds four, i.e., reaches five. In response to the detection of the task runaway, the CPU 2 performs the exception processing.

An expiration interval of a general watchdog time is set longer than a clear interval of a program. As a result, there is a relatively large time lag between occurrence and detection of the task runaway.

According to the fourth embodiment, the CPU 2 can detect the runaway of the other task by using the task S. The timer is incremented by the task S and the timer value is monitored by the task S. In such an approach, when the other task does not set the clear flag to one, the task S can detect the runaway of the other task as soon as the task runaway occurs. Thus, the fourth embodiment achieves little time lag between occurrence and detection of the task runaway.

(Modifications)

The embodiment described above may be modified in various ways. For example, in the first embodiment, one of the AND gates 14, 15 can be eliminated. A NOT gate may be connected to the second input of the AND gate 14 so that the AND gate 14 can output the first interrupt request signal INT when the CPU 2 executes the read cycle. Three or more task may be simultaneously performed. When the task runaway is detected, the CPU 2 or the entire microcomputer system 1 may be reset by a hardware approach. The first, second, third exception processing E1-E3 in FIG. 4B may be the same.

In the second embodiment, the runaway detector 34 may includes an AND gate acting in a similar manner as the AND gate 14 according to the first embodiment. In this case, the task runaway may be detected, when the execution address placed on the address bus 38 is within the program area for the task Z despite the fact that the slave CPUs 32A2-32An perform the bus access. The microcomputer system 31 may include an arbiter for performing bus arbitration. The arbiter may assert the access signal when the master CPU 32A1 is granted.

In the third embodiment, the runaway detector 42 may includes an AND gate acting in a similar manner as the AND gate 14 according to the first embodiment. In the fourth embodiment, the timer may be decremented.

Some bits of the address registers 11, 12, 35, 36, 11A, 43 may be variable. All bits of the address registers 12A, 44 may be fixed. An 8, 16, 64, or more-bit CPU may be used instead.

Such changes and modifications are to be understood as being within the scope of the present invention as defined by the appended claims.

What is claimed is:

1. A microcomputer system for simultaneously performing a plurality of tasks by time sharing, one of the plurality of tasks being defined as a most important task having a higher priority than any other task, the microcomputer system comprising:
   a central processing unit including a signal output section for outputting a task information signal indicative of whether the central processing unit performs the most important task at a present time, the task information signal having a first state if the central processing unit performs the most important task at the present time and having a second state if the central processing unit doesn't perform the most important task at the present time;
   a memory having a program area for storing a program for the most important task, the program area being defined by a program start address and a program end address; and
   a runaway detector including a program start address register for storing the program start address, a program end address register for storing the program end address, and a program area checker for determining whether an execution address, where an instruction performed by the central processing unit at the present time is located, is within the program area by comparing the execution address with each of the program start address and the program end address, the runaway detector receiving the task information signal from the central processing unit and detecting a task runaway in the event of conflict between a state of the task information signal and a result of a determination of the program area checker, wherein
   the memory further has a data area for storing data for the most important task, the data area being defined by a data start address and a data end address, the runaway detector further includes a data start address register for storing the data start address, a data end address register for storing the data end address, and a data area checker for determining whether the execution address is within the data area by comparing the execution address with each of the data start address and the data end address, and the runaway detector detects the task runaway in the event of conflict between the state of the task information signal and a result of a determination of the data area checker.

2. The microcomputer system according to claim 1, wherein
the runaway detector detects the task runaway, when the task information signal has the first state and the program area checker determines that the execution address is outside the program area.

3. The microcomputer system according to claim 1, wherein
the runaway detector detects the task runaway, when the task information signal has the second state and the program area checker determines that the execution address is within the program area.

4. The microcomputer system according to claim 1, wherein
at least one of bits starting from a most significant bit of at least one of the program start address register and the program end address register is fixed.

5. The microcomputer system according to claim 1, wherein
at least one of bits starting from a least significant bit of at least one of the program start address register and the program end address register is fixed.

6. The microcomputer system according to claim 1, wherein
all bits of at least one of the program start address register and the program end address register are fixed.

7. The microcomputer system according to claim 1, wherein
when the runaway detector detects the task runaway, the runaway detector clears each of the program start address register and the program end address register and outputs an interrupt request signal to the central processing unit, and
when the central processing unit receives the interrupt request signal, the central processing unit performs an exception processing to correct the task runaway.

8. The microcomputer system according to claim 7, wherein
the exception processing resets each of the program start address register and the program end address register to the program start address and the program end address, respectively.

9. A microcomputer system for simultaneously performing a plurality of tasks by time sharing, one of the plurality of tasks being defined as a most important task having a higher priority than any other task, the microcomputer system comprising:
a central processing unit including a signal output section for outputting a task information signal indicative of whether the central processing unit performs the most important task at a present time, the task information signal having a first state if the central processing unit performs the most important task at the present time and having a second state if the central processing unit doesn't perform the most important task at the present time;
a memory having a program area for storing a program for the most important task, the program area being defined by a program start address and a program end address;
a runaway detector including a program start address register for storing the program start address, a program end address register for storing the program end address, and a program area checker for determining whether an execution address, where an instruction performed by the central processing unit at the present time is located, is within the program area by comparing the execution address with each of the program start address and the program end address, the runaway detector receiving the task information signal from the central processing unit and detecting a task runaway in the event of conflict between a state of the task information signal and a result of a determination of the program area checker; and
a counter controlled by the most important task and incremented from an initial value at a first interval, wherein
the central processing unit performs the most important task at the first interval,
the memory further has a shared area accessible by both the most important task and the other task,
a clear flag is set in the shared area by the other task at a second interval,
the most important task monitors the clear flag, and clears the counter to the initial value when the clear flag is set, and
the task runaway is detected, when the counter exceeds a threshold value.

* * * * *